US012591500B2

(12) United States Patent
T et al.

(10) Patent No.: US 12,591,500 B2
(45) Date of Patent: Mar. 31, 2026

(54) EVENT MONITORING AND CODE AUTOCORRECTING BATCH PROCESSING SYSTEM

(71) Applicant: Bank of America Corporation, Charlotte, NC (US)

(72) Inventors: Arjun I. T, Malappuram (IN); Vaishali Machado, Mumbai Suburb (IN); Durga Prasad Kutthumolu, Hyderabad (IN); Arun V, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/586,950

(22) Filed: Feb. 26, 2024

(65) Prior Publication Data

US 2025/0272215 A1      Aug. 28, 2025

(51) Int. Cl.
| | |
|---|---|
| *G06F 11/36* | (2025.01) |
| *G06F 8/30* | (2018.01) |
| *G06F 11/3604* | (2025.01) |

(52) U.S. Cl.
CPC ............ *G06F 11/3608* (2013.01); *G06F 8/31* (2013.01)

(58) Field of Classification Search
CPC .............................. G06F 11/3608; G06F 8/31
See application file for complete search history.

(56) References Cited

U.S. PATENT DOCUMENTS

| | | | |
|---|---|---|---|
| 9,886,247 B2 | 2/2018 | Laredo et al. | |
| 10,133,268 B2 | 11/2018 | Bokis et al. | |
| 10,133,650 B1 | 11/2018 | Park et al. | |
| 10,558,554 B2 * | 2/2020 | Bhandarkar | ........ G06F 11/3072 |
| 10,740,164 B1 | 8/2020 | Roy et al. | |
| 10,740,215 B2 | 8/2020 | Lowe et al. | |
| 10,810,115 B2 * | 10/2020 | Manchiraju | ........... G06F 11/368 |
| 11,343,146 B1 * | 5/2022 | Mohanty | ........... G06F 18/24147 |
| 11,526,155 B2 | 12/2022 | Ma et al. | |

(Continued)

OTHER PUBLICATIONS

Levi, Stuart D et al. An Introduction to Smart Contracts and Their Potential and Inherent Limitations. Harvard Law School Forum on Corporate Governance (Year: 2018).*

*Primary Examiner* — Michael Maskulinski
*Assistant Examiner* — Kayo Lisa Rusin
(74) *Attorney, Agent, or Firm* — Banner & Witcoff, Ltd.

(57) ABSTRACT

Various aspects of the disclosure relate to automated and continuous monitoring of batch processing jobs executing in a multi-node environment. The autocorrecting batch processing system generates prompts based on the identified failure information. When the autocorrecting batch processing system identifies a failure event a quantum artificial intelligence (AI) prompt generator generates a prompt for use when automatically generating code snippets. The prompt is stored in a non-linear database and is passed to a generative AI engine, which is trained to generate multiple code snippets based on the prompts generated by a quantum AI prompt generator. These code snippets are automatically evaluated against smart contracts stored in an enterprise organization's blockchain network to ensure that AI generated code snippets adhere to the organization's security regulations. Approved code segments are provided to the faulted node for inclusion in real-time to resume the batch processing job from the point of failure.

17 Claims, 4 Drawing Sheets

(56)     References Cited

U.S. PATENT DOCUMENTS

| 11,656,932 | B2 | | 5/2023 | Mahamuni et al. | |
| 11,762,635 | B2 | | 9/2023 | Brown | |
| 12,223,343 | B2 | * | 2/2025 | Nguyen | G06F 9/5038 |
| 2007/0214381 | A1 | * | 9/2007 | Goyal | G06F 11/1482 |
| | | | | | 714/5.1 |
| 2007/0214457 | A1 | * | 9/2007 | Goyal | G06F 16/1774 |
| | | | | | 718/101 |
| 2016/0098293 | A1 | * | 4/2016 | Schmidt | G06F 9/4818 |
| | | | | | 718/101 |
| 2017/0046217 | A1 | * | 2/2017 | Shinde | G06F 11/3495 |
| 2017/0063908 | A1 | * | 3/2017 | Muddu | G06F 16/285 |
| 2021/0256447 | A1 | | 8/2021 | Cmielowski et al. | |
| 2021/0318923 | A1 | * | 10/2021 | Agarwal | G06F 11/0793 |
| 2021/0342214 | A1 | * | 11/2021 | Madawat | G06F 11/3006 |
| 2022/0334933 | A1 | * | 10/2022 | Zhu | G06F 9/4881 |
| 2023/0018199 | A1 | * | 1/2023 | Mahamuni | G06F 11/3051 |
| 2023/0370250 | A1 | | 11/2023 | Sung | |
| 2024/0303178 | A1 | * | 9/2024 | Paquin | G06F 11/3608 |

* cited by examiner

100

104

EVENT MONITORING AND CODE AUTOCORRECTING BATCH PROCESSING SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information with external computer systems in providing and/or supporting different products and services offered by the organization.

Often, the exchange and/or processing of information on the enterprise network involves performing activities via scheduled batch processing jobs that may operate over long periods of time. In a node-based architecture system, if failure occurs during a long running scheduled batch job, the entire workflow is disrupted. For example, details of the error condition must be analyzed to identify the root cause. Once a solution is found, the workflow of the batch job cannot be re-started at the point of error, thus causing the workflow to resume execution from the initial stage. Such problems cause a loss of productivity and can impact other scheduled jobs that are planned to run in sequence, such as database update or operations, network security operations, operating system patching activities, and/or the like. Additionally, each error are currently analyzed independently with minimal, if any, correlation being established between known errors occurring at different nodes. Instead, such dependencies are dependent on system knowledge and/or expertise that is often not recorded or passed on.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automatic identification of errors occurring during job execution, identification of a previously identified solution and/or generation of a prompt for use in generation of possible code fixes, evaluation of each automatically generated code fix segments including network security conformance analysis, and/or automatic implementation of the code fix to overcome the encountered error and allow the batch job to continue in real-time from the point of error.

Aspects of the disclosure relate to computer hardware and software. In particular, one or more aspects of the disclosure generally relate to computer hardware and software for identifying errors encountered during a batch processing activity, automatically analyzing the error, and generating code to fix the error in real-time, and ensuing the generated code meets enterprise security standards.

An autocorrecting batch processing system may be designed with capabilities to automatically detecting and resolving failure points encountered in multi-node batch processing architectures and, in some cases, leveraging quantum computing algorithm and generative artificial intelligence (AI) capabilities. When long running batch job fails at a node of the multi-node system, the autocorrecting batch processing system may include a quantum AI prompt generator that generates a prompt corresponding to that failure point and capturing all system details. This automatically generated prompt is persisted in a NOSQL database system along with a timestamp. The autocorrecting batch processing system routes this prompt to a generative AI-based resolution engine (e.g., a text-based generation engine) that predicts multiple resolutions (e.g., code segments) to the issue. The autocorrecting batch processing system the validates each of the multiple solutions via the resolution smart contracts established in a blockchain ecosystem. For example, the resolution smart contracts may enable evaluation against one or more network security policies and/or business rules to ensure compliance to established network policies to ensure network security measures are maintained. A target solution that satisfies the smart contract(s) is correlated against the automatically generated prompt and the autocorrecting batch processing system stores the approved target solution in the NoSQL database in a separate record. The autocorrecting batch processing system then automatically applies the target solution at the responsible node, and cause the execution process to be initiated from that failure point rather than initial stage.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
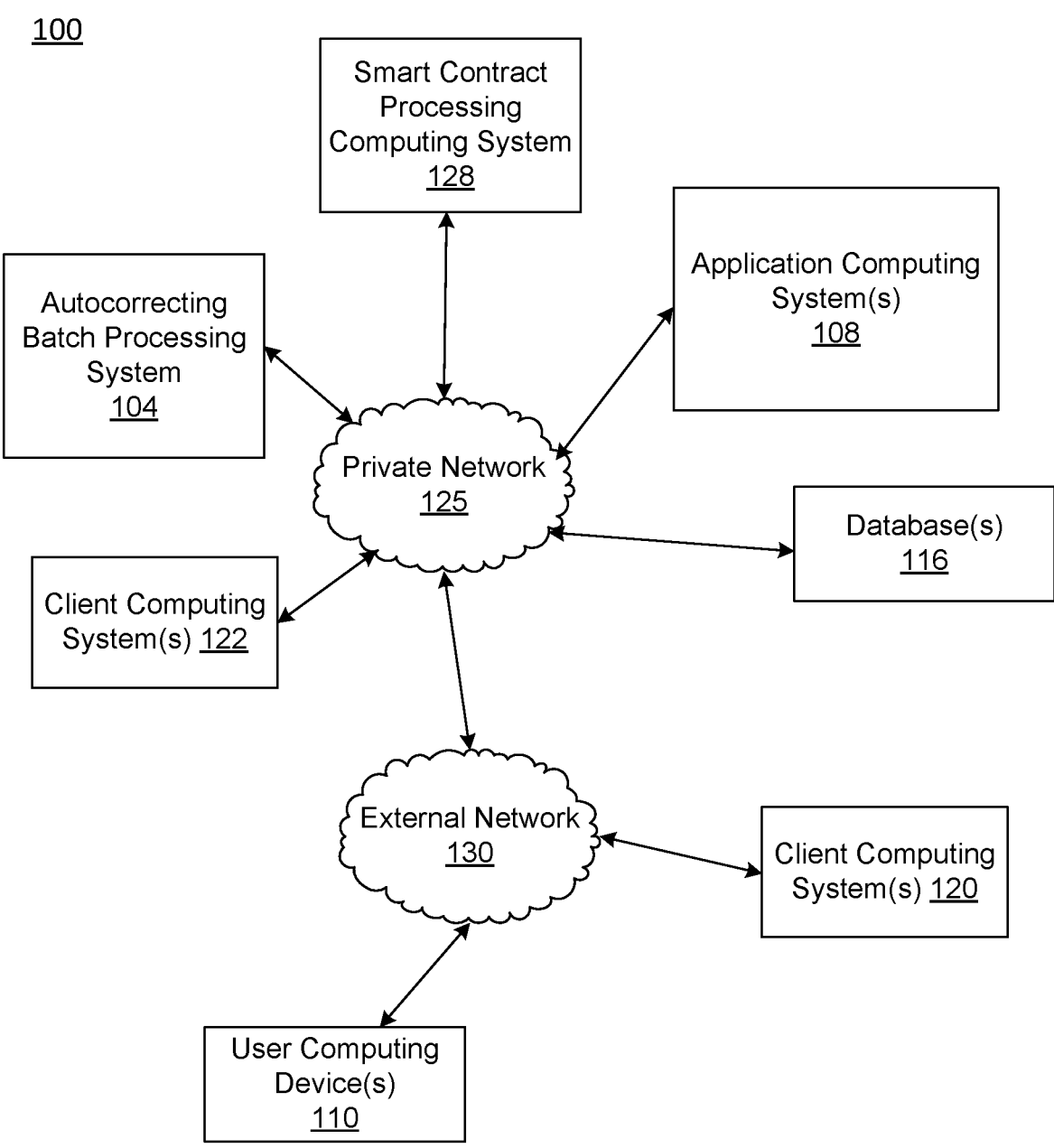
FIG. 1A shows an illustrative computing environment for autocorrecting batch processing jobs in real-time, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

An autocorrecting batch processing system may be designed with capabilities to automatically detecting and resolving failure points encountered in multi-node batch processing architectures and, in some cases, leveraging quantum computing algorithm and generative artificial intelligence (AI) capabilities. When long running batch job fails at a node of the multi-node system, the autocorrecting batch processing system may include a quantum AI prompt generator that generates a prompt corresponding to that failure point and capturing all system details. This automatically generated prompt is persisted in a NOSQL database system along with a timestamp. The autocorrecting batch processing system routes this prompt to a generative AI-based resolution engine (e.g., a text-based generation engine) that predicts multiple resolutions (e.g., code segments) to the issue. The autocorrecting batch processing system the validates each of the multiple solutions via the resolution smart contracts established in a blockchain ecosystem. For example, the resolution smart contracts may enable evaluation against one or more network security policies and/or business rules to ensure compliance to established network policies to ensure network security measures are maintained. A target solution that satisfies the smart contract(s) is correlated against the automatically generated prompt and the autocorrecting batch processing system stores the approved target solution in the NoSQL database in a separate record. The autocorrecting batch processing system then automatically applies the target solution at the responsible node, and cause the execution process to be initiated from that failure point rather than initial stage.

In some cases, a quantum AI prompt generator (e.g., an analysis engine) may continuously monitor events generated from one or more nodes of a multi-node computing system (e.g., an application computing system, a client computing system, and the like) connected to the enterprise network. Whenever a failure is identified, The quantum AI prompt generator identifies which component or components experienced an error and exactly which code has caused the failure. The quantum AI prompt generator may use an AI-enabled quantum processing engine for faster processing, which may allow for faster generation of the prompts with an insight on the root cause of that issue and which entitlement is required to fix this issue. In some cases, the quantum AI prompt generator may incorporate a classical computing system as at least part of the analysis, monitoring, and/or generation processes.

In some cases, the quantum AI prompt generator may include a quantum AI processor that may transmit the prompt generated to a generative AI engine (e.g., a code generation engine) for code snippet generation and may also store the prompt with a timestamp in a data repository (e.g., a NOSQL database). In some cases, the quantum AI prompt generator may also associate the prompt and/or generated code with an error condition and/or a code segment causing the failure condition. The quantum AI prompt generator may also establish a two-way communication with the generative AI module. For example, the quantum AI prompt generator may provide the generative AI module with additional information to improve code snippet generation, such as by providing further evaluation results and/or information concerning multiple interconnected nodes.

In some cases, the code generation engine may include a generative AI component that is capable of generating multiple code snippets based on the failure prompt to solve the underlying problem identified in the multi-node network during processing of the batch job. These code snippets are evaluated, in series or parallel, against a plurality of smart contracts stored in the enterprise organization's blockchain (e.g., a private blockchain) using an AI-driven information security module (e.g., a security interface engine). The smart contracts may be associated with a network security group, and/or one or more business units that utilize processes and/or services involved with the failed batch job and/or with computing systems (e.g., application computing systems, client computing systems, data repositories, and the like) associated with the batch jobs. The smart contracts may also include rules and/or policies to be evaluated as part of the smart contract conditions.

The information security module may find the best solution out of the multiple generated code snippets, where the best solution may be identified as a consensus decision associated with approved smart contracts of the plurality of smart contracts. The information security module may then cause the code generation engine to send the code directly to the affected node or nodes where execution of the batch job failed. Also, the code generation engine may store this code snippet in the data repository (e.g., NOSQL Db and associated with the prompt message. In some cases, the quantum AI-generator may be capable of performing a quick fix, without generation of new code snippets, if a previously solved error or failure condition has been identified. For example, the code generation engine may search the NOSQL database to identify the previously generated solution and directly provide that code segment to the node experiencing the error to be inserted as replacement code within the batch file to allow the batch job to resume execution from the failure point. In some cases, the autocorrecting batch processing system may perform the actions within microseconds or milliseconds of the failure occurring, to allow the batch job to be fixed in real-time and remove downtime previously resulting from batch processing errors.

FIG. 1A shows an illustrative computing environment 100 for autocorrecting batch processing jobs, in accordance with one or more arrangements. The computing environment 100 may comprise one or more devices (e.g., computer systems, communication devices, and the like). The computing environment 100 may comprise, for example, an autocorrecting batch processing system 104, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more client computing systems 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the autocorrecting batch processing system 104 as a stand-alone system, the API route testing system may be implemented as a component of one or more different computing systems, such as the application computing systems 108.

The autocorrecting batch processing system 104 may comprise one or more computing devices and/or other computer components (e.g., processors, memories, communication interfaces) configured to perform one or more functions as described herein. Further details associated with the architecture of the autocorrecting batch processing system 104 are described with reference to FIG. 1B.

The application computing systems 108 and/or the client computing systems 122 may comprise one or more computing devices and/or other computer components (e.g., processors, memories, communication interfaces). In addition, the application computing systems 108 and/or the client computing systems 122 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing systems 122 and/or the application computing systems 108 may comprise various servers and/or databases that store and/or otherwise maintain account information, such as financial account information including account balances, transaction history, account owner information, and/or other information. In addition, the client computing systems 122 and/or the application computing systems 108 may process and/or otherwise execute transactions on specific accounts based on commands and/or other information received from other computer systems comprising the computing environment 100. In some cases, one or more of the client computing systems 122 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing systems 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the autocorrecting batch processing system 104. For example, the database(s) 116 may include an unstructured data repository (e.g., a NOSQL database) to store batch file job error or failure information, automatically generated prompts, generated code snippets, and/or the like. In an arrangement, the database(s) 116 may be used for other purposes as described herein. In some cases, the client computing systems 120 may write data or read data to the database(s) 116 via the services.

The smart contract processing computing system 128 may include a blockchain enabled computing system, such as a private blockchain computing system, that may provide a persistent record of smart contracts, rules, and/or policies used to approve use of generated code snippets. The smart contract processing computing system 128 may include a mechanism to initiate operation of smart contracts upon generation of each code snippet, where the code snippet and/or operations performed based on the code snippet, are automatically analyzed against network security rules, business policies, and/or the like, through smart contract execution. The smart contract processing computing system 128 may provide automatic approval of one or more code snippets, such as via a consensus mechanism, where a code snippet having a greatest consensus among a plurality of applicable smart contracts is automatically approved for incorporation into the failed batch code. If, however, a consensus is not reached automatically, a new rule set proposal may be generated for analysis, such as via presentation and user interaction via a user device.

In one or more arrangements, the autocorrecting batch processing system 104, the API route testing system 105, the application computing systems 108, the client computing systems 122, the smart contract processing system 128, the client computing systems 120, the user devices 110, and/or the other devices/systems in the computing environment 100 may be any type of computing device capable of receiving input via a user interface, and communicating the received input to one or more other computing devices in the computing environment 100. For example, the autocorrecting batch processing system 104, the API route testing system 105, the application computing systems 108, the client computing systems 122, the smart contract processing system 128, the client computing systems 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the autocorrecting batch processing system 104, the API route testing system 105, the application computing systems 108, the client computing systems 122, the smart contract processing system 128, the client computing system 120, the user devices 110, and/or the other devices/systems in the computing environment 100 may, in some instances, be and/or comprise special-purpose computing devices configured to perform specific functions.

Figure 1B:
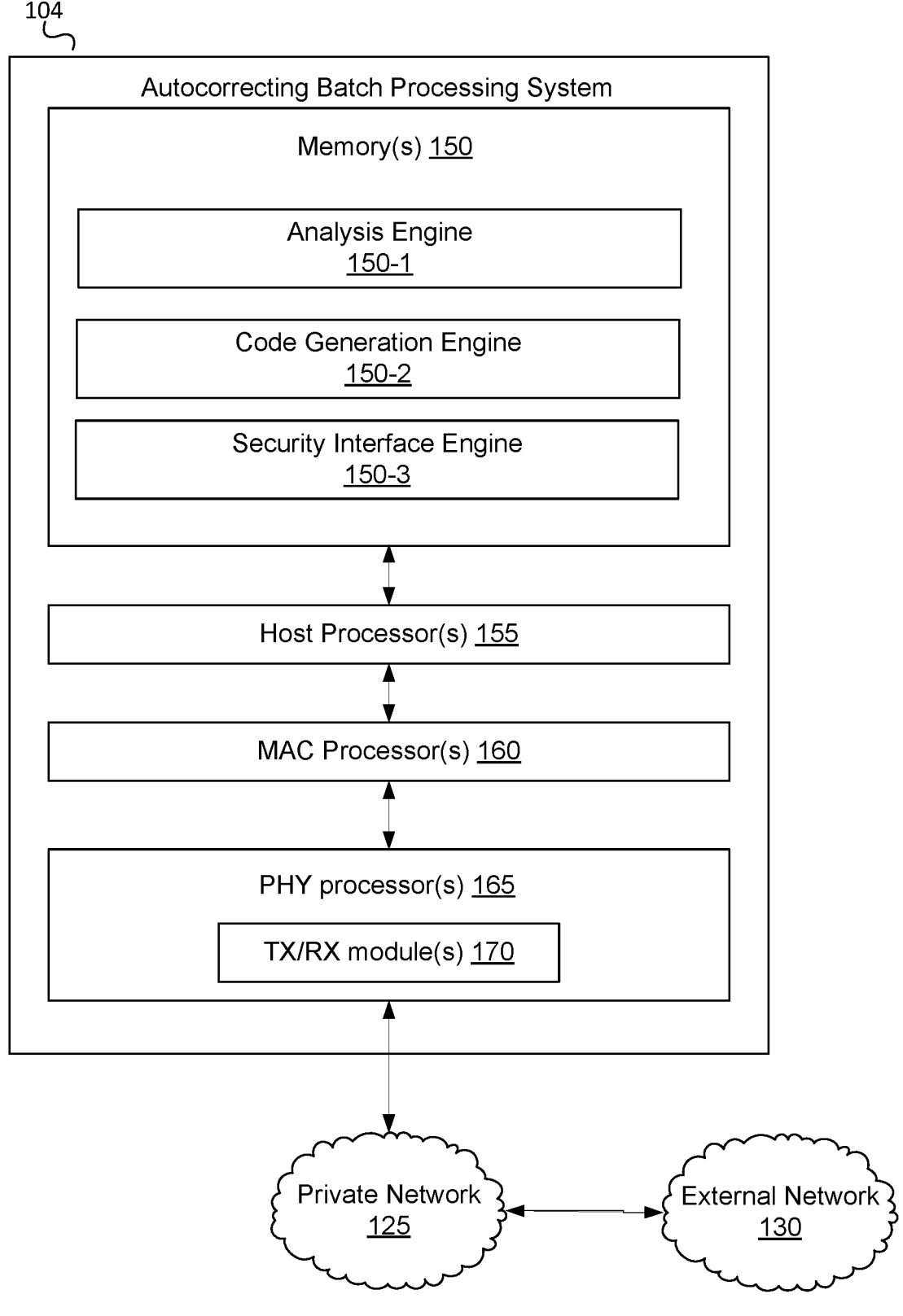
FIG. 1B shows an illustrative computing platform enabled for autocorrecting batch processing jobs in real-time, in accordance with one or more aspects described herein.

FIG. 1B shows an illustrative autocorrecting batch processing system 104 in accordance with one or more examples described herein. The autocorrecting batch processing system 104 may be a stand-alone device and/or may at least be partial integrated with the autocorrecting batch processing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The autocorrecting batch processing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the autocorrecting batch processing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the autocorrecting batch processing system 104 may be configured to execute machine readable instructions stored in memory 150. The memory 150 may comprise (i) one or more program modules/engines having instructions that when executed by the one or more processors cause the autocorrecting batch processing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the autocorrecting batch processing system 104 and/or by different computing devices that may form and/or otherwise make up the autocorrecting batch processing system 104. For example, the memory 150 may have, store, and/or comprise an analysis engine 150-1, a code generation engine 150-2, a security interface engine 150-3, and/or the like. The analysis engine 150-1 may have instructions that direct and/or cause the autocorrecting batch processing system 104 to perform one or more operations associated with monitoring operation of each batch processing job performed on the enterprise network, such as in a multi-node environment, and automatically generating a code prompt to be used when generating code snippets to correct the failure and/or to provide a previously generated code snippet to correct a same or similar failure, and the like. The code generation engine 150-2 may have instructions that may cause the autocorrecting batch processing system 104 to automatically generate one or more code snippets based on the code prompt to correct a batch job failure. The security interface engine 150-3 may have instructions that may cause the autocorrecting batch processing system 104 to automatically evaluate, based on smart contract operations, whether one or more generated code snippets conform to network security protocols, business policies, and/or operational rule sets, and the like.

While FIG. 1A illustrates the autocorrecting batch processing system 104 and/or the application computing systems 108, as being separate elements connected in the private network 125, in one or more other arrangements, functions of one or more of the above may be integrated in a single device/network of devices. For example, elements in the autocorrecting batch processing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108 and/or the smart contract processing computing system 128.

Figure 2A:
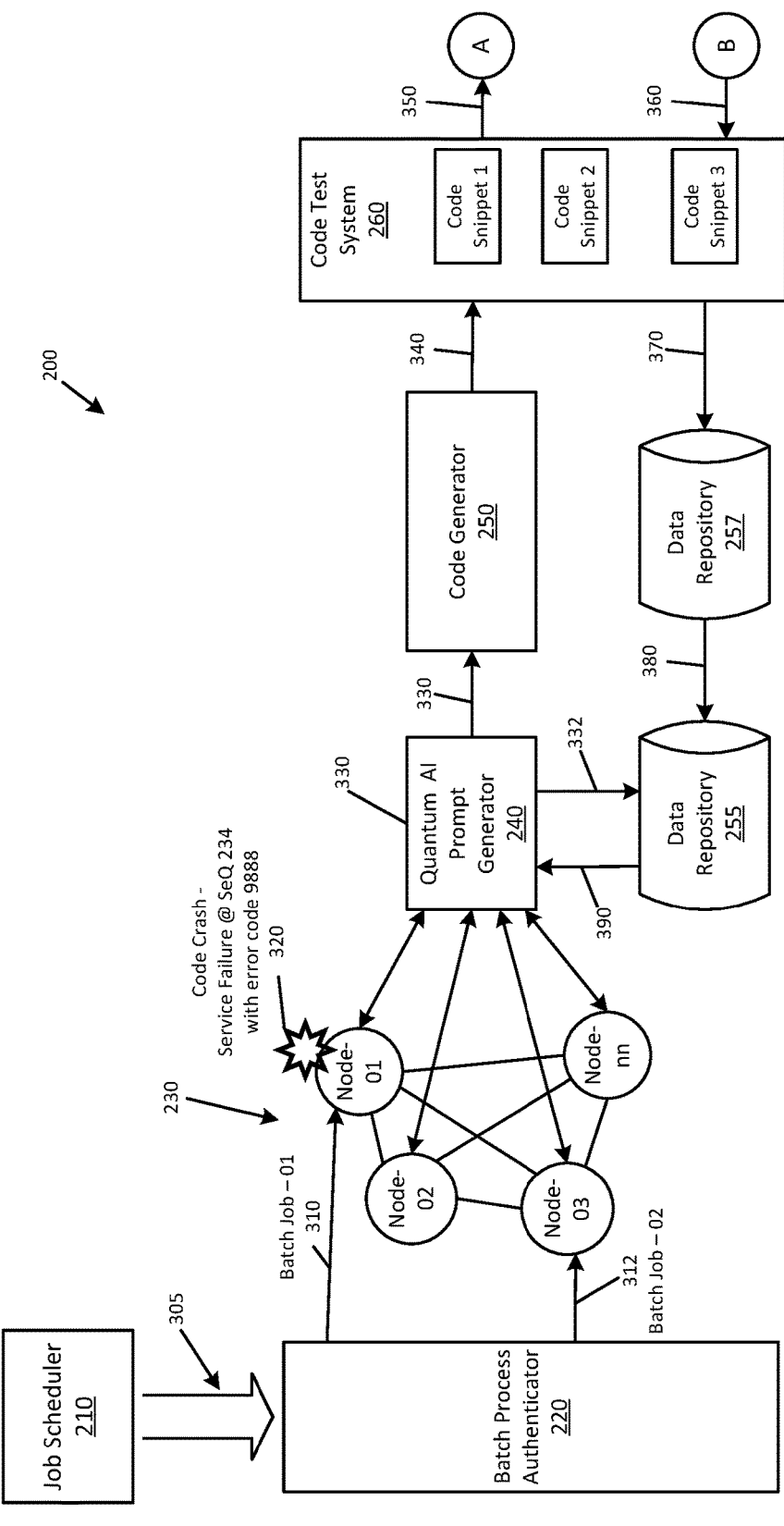
FIGS. 2A and 2B show an illustrative system performing a process of autocorrecting batch process errors occurring in a multi-node system, in accordance with one or more aspects described herein.
Figure 2B:
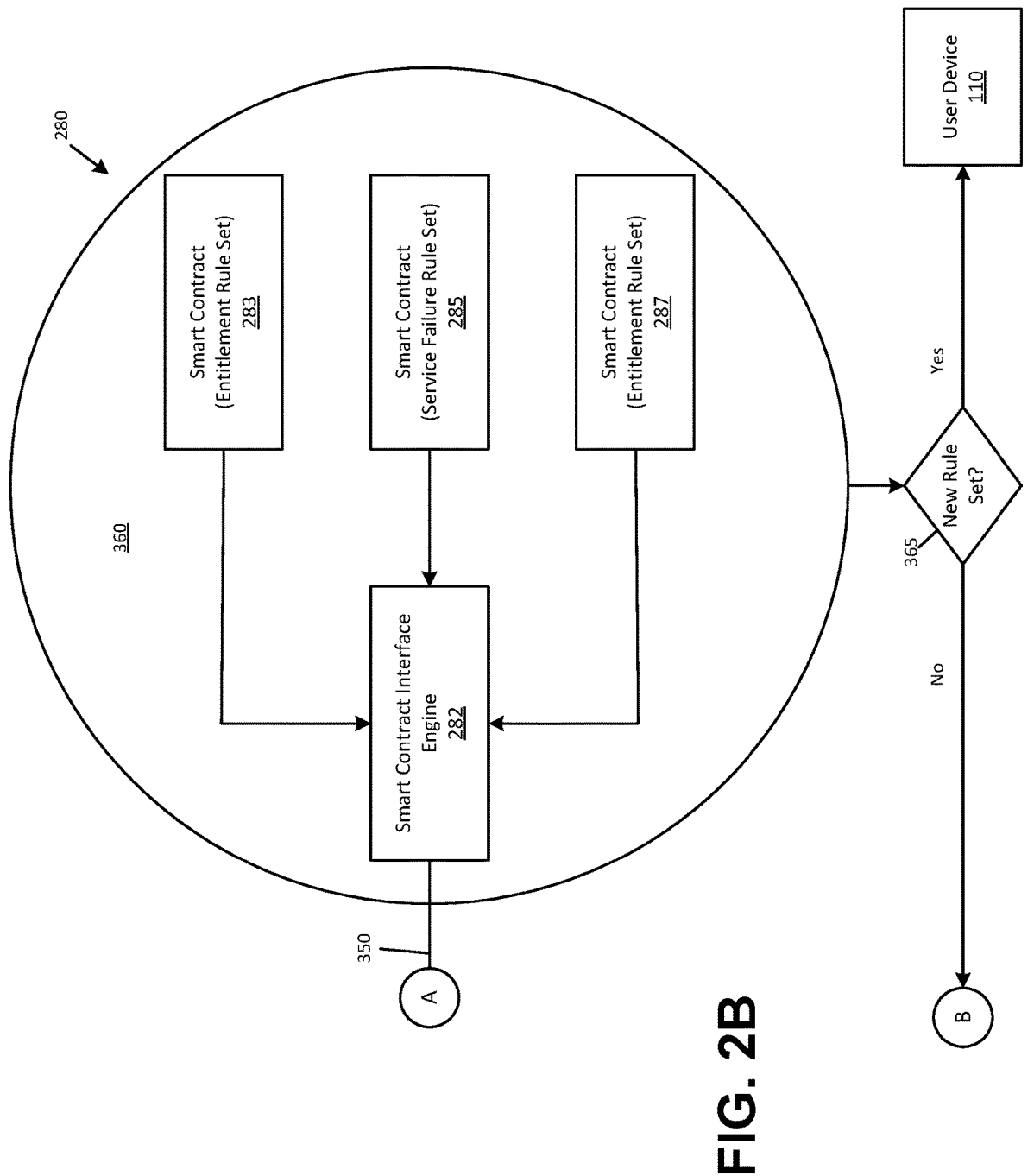

FIGS. 2A and 2B show an illustrative system performing a process of autocorrecting batch process errors occurring in a multi-node system, in accordance with one or more aspects described herein. In an illustrative process, a user submits one or more batch processing requests. A batch process authenticator allows the user to access interconnected multi node network after checking user's entitlements. A built-in execution scheduler will assign nodes for execution of the batch processing job and/or portions of the batch processing job. If, during execution, the processing job encounters a runtime error, the batch processing system generates a failure event (e.g., 'Code crash<<Service failure @ SeQ 234 with Error Code 9888>>').

In response to the error a quantum AI generator receives the failure event, along with associated failure event information such as processed code, utilized systems, and the like, and it will prepare a prompt based on the error. This prompt gets saved in the unstructured database with a time stamp. If no similar prompts are present in the database, as identified by the quantum AI generator, the prompt is transferred to a text-based generative AI module or engine. The generative AI module creates multiple code snippets based on the prompt received. Each code snippet is transferred to organizations information security module.

Information security module checks the security aspects of given code snippets against all the smart contact available in organization's block chain. The information security module shares a most appropriate code snippet information back to the code snippet queue and the most appropriate code snippet is stored in code snippet database (e.g., the unstructured database). From the unstructured database, the quantum AI prompt engine selects the code snippet and implements the necessary fix in impacted code being processed on the node experiencing the failure. This quantum AI prompt engine (e.g., a resolution module) triggers the re-execution of the batch job from the line that previously experienced the failure condition. The information security module passes the code snippets to user devices associated with the organization's information security group if it is not able to find any smart contract related to the change. The information security group can confirm the best solution and send that information back to code snippet module, as well as generate a new smart contract associated with this new policy and store the new smart contract in the blockchain. If a similar issue occurred in the past, then the database will have records associated with the information related to the issue, along with any generated prompt and the most appropriate used code snippet installed to solve that issue. In such cases, the AI prompt generator module make the code fix directly by referring the database entries and installing the code within the batch job on the affected node or nodes. In some cases, the AI prompt generator module may be implemented in a classical computing system, a quantum computing system, and/or a hybrid computing system.

An autocorrecting batch processing system 200, as shown in FIGS. 2A and 2B, may be implemented in a classical computing system, a quantum computing system, and/or a hybrid computing system. As shown, the autocorrecting batch processing system may include a job scheduler 210, a batch process authenticator 220, a plurality of processing nodes 230, a quantum AI prompt generator 240, a code generator, one or more data repositories 255 and 257, a code test system, and a smart contract processing system 280 that may include a smart contract interface engine 282 capable of coordinating processing, monitoring, and evaluating results of one or more smart contracts 283, 285, and 287 that may be stored in a blockchain or other distributed ledger computing system or the like.

In an illustrative example, a user, or computing system, submits one or more batch processing requests. A batch processing authenticator allows the user, or computing system, to access an interconnected multi node network after checking user's entitlements. A built-in execution scheduler will assign one or more nodes for execution of the batch process. During execution, the batch process may encounter a runtime error, for example, the system may generate a failure event 'Code crash<<Service failure @ SeQ 234 with Error Code 9888>>'. A quantum AI generator receives the failure event and prepares a prompt based on the error. This prompt is saved in a database with a time stamp and/or other error information. If no similar prompts present in database, the prompt may be sent to a text-based generative AI module. The generative AI module creates multiple code snippets based on the prompt received. The code snippets are then transferred to an information security module that checks the security aspects of given code snippets against all the smart contact available in organization's block chain or other distributed ledger computing system. The information security module shares a most appropriate code snippet info back to a code snippet queue and this will get stored in code snippet database. The quantum AI prompt engine loads, from the database, the code snippet and make the necessary fix in impacted module of the affected node. This module will also trigger the execution from the line that caused the exception. The information security module also passes the code snippets to the organization's information security group, via one or more user devices, if no applicable smart contracts are found related to the change. Via feedback received form the user device, the information security group confirms the best solution and send that information back to code snippet module. If a similar issue occurred in the past, the database will have the information related to the issue associated with a previously generated prompt and an associated and approved code snippet that was previously used to solve that issue. In that case, the quantum AI prompt generator module can make the code fix directly referring the database entries.

For example, in FIGS. 2A and 2B, at 305, the job scheduler 210 (e.g., a batch processing scheduling computing system, a user device, and/or the like) may forward one or more batch jobs to be processed to the batch process authenticator 220 to authenticate the batch job and, when authenticated, provide each batch job to the plurality of processing nodes 230 for processing, such as the batch job-01 at 310 and the batch job-02 at 312. Each batch job may be processed by one or more of the plurality of processing nodes 230 (e.g., node-01, node-02, node-03, node-nn, and/or the like). In some cases, a processing node may encounter or otherwise experience an error condition 320 during processing of one or more of the batch jobs (e.g., a code crash caused by a service failure and a particular line of code (e.g., SeQ 234) where the processing node may additionally provide an error code (e.g., error code 9888). In some cases, one or more of the batch process authenticator 220 and/or the quantum AI prompt generator 240 may monitor the run-time operation of the plurality of nodes 230. In some cases, a processing monitoring engine may be implemented on these or other computing devices to monitor operation of the batch job while being processed by the plurality of processing nodes 230.

The quantum AI prompt generator 240 may automatically receive details of the batch job processing error, analyze the error, and generate a text prompt that may be used for generating code snippets that may be used to resolve the error. In some cases, the quantum AI prompt generator may store the prompts in a data repository (e.g., the data repository 255) with timestamp information, error information, batch job information (e.g., scripting language information, line number information, operating system information at the node, network communication error information) and/or the like. The quantum AI prompt generator may automatically communicate one or more prompts to the code generator 250 for use in automatically generating one or more code snippets that may be used to resolve the encountered error 320 encountered during the batch job. The code generator 250 may automatically generate one or more code snippets (e.g., code snippet 1, code snippet 2, code snippet 3, and the like), where each code snippet may be generated by a generative AI engine. The code snippets 1-3 each may be created to potentially solve an error causing the error 320 and are provided to the code test system 260, at 340. The code test system 260 may individually integrate each of the code snippets (e.g., code snippets 1-3) into test code to determine whether the error 320 causing the code crash may be resolved.

Additionally, the code test system 260 may provide one or more of the code snippets to the smart contract interface engine 282 of the smart contract processing system 280 to be evaluated against one or more different rule sets, via one or more of the smart contracts 283, 285, and 287. In some cases, a "best fit" code snippet may be forwarded from the code test system. In some cases, multiple code snippets may be forwarded, particularly if multiple code snippets resolve the error condition encountered during operation. For example, depending on the error, the batch file being processed, computing systems (e.g., application computing systems 108) being accessed, and/or client computing systems 120, 122 being involved, the smart contract interface engine 282 may initiate action by one or more smart contracts 283, 285, and 287. For example, a code snippet may be associated with operations associated with two or more business units, so that different entitlement rule sets may need to be applied via the smart contracts 283, and 287, where each entitlement rule set is associated with a different rule set or combination of rules. Additionally, an error condition, error code, or other failure indicator may involve a service failure rule set, associated with the smart contract 285, which may be triggered. Each smart contract may be applied to multiple code snippets to ensure that each potential solution aligns with the rules memorialized within the smart contracts 283, 285, 287, and the like. At 365, for each code snippet being evaluated, a determination is made whether the particular code snippet meets the requirements of the rule set(s) the applied smart contract(s). If, at 365, the code snippet fails to meet the requirements of at least one smart contract, a new rule set may be required, so that the code snippet, smart contract information, and/or the error condition information may be communicated for display at a user device 110 to be analyzed and/or approved. If approved, a new rule or rule set may be created an either added to one or more existing smart contracts and/or a new smart contract may be generated and the code snippet(s) may be reevaluated by the smart contract interface engine 282. If, at 365, the smart contract conditions have been met, the approved code snippet(s) may be sent back to the code test system at 360 for final evaluation, where one or more code snippets may be stored in the data repository 257 at 370. At 380, information associating a prompt stored in the data repository 255 and one or more code snippets in the data repository 257 may be associated with both the code snippet and the code segment(s), and/or associated smart contracts in the respective database. At 390, quantum AI prompt generator may retrieve an approved code snippet associated with the prompt and may cause the code snippet to be inserted into the batch job code that experienced the error. In some cases, the code snippet replaces the line(s) of code where the failure occurred and the quantum AI prompt generator 240 may cause the processing node(s) to continue processing the batch job from that execution point.

In some cases, the quantum AI prompt generator 240, upon creation of the prompts, may search the data repository 255 for the same or similar prompts and, if found, may upload an associated code segment for inclusion into the batch job. Because the code segment has already been created, tested, and approved against the smart contracts, the resolution of the code crash of the processing error 320 is resolved quickly (e.g., within milliseconds) of the error condition occurrence.

Because the quantum AI prompt generator 330, the code generator 250, the code test system 260, and/or the smart contract processing system 280 are operational on a quantum computing device, processing is sufficiently fast to allow for real-time resolution of errors encountered by the batch job, such that processing may be resumed within milliseconds to seconds from encountering the error and may proceed from the corrected line of code.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
   a plurality of processing nodes, wherein one or more of the plurality of processing nodes process a batch job process;
   a batch process error recovery system, comprising:
      at least one processor; and
      memory storing computer-readable instructions that, when executed by the at least one processor, cause the batch process error recovery system to:
         receive, from a node of the plurality of processing nodes, an indication of a batch process error;
         generate a text prompt associated with the batch process error;
         generate, by a code generator and from the text prompt, at least one code snippet to resolve the batch process error;
         test, each code snippet of the at least one code snippet, whether the at least one code snippet resolves the batch process error;
         perform a security check on each code snippet of the at least one code snippet;
         replace a portion of the batch job process with the code snippet; and
         restart, from a failure point in the batch job process, the batch job process.

2. The system of claim 1, wherein the text prompt is generated by a quantum prompt generator based on error information received from the node.

3. The system of claim 1, wherein the code generator comprises a generative artificial intelligence engine that automatically generates the at least one code snippet based on the text prompt.

4. The system of claim 1, wherein the security check comprises an analysis of each code snippet to at least one rule set.

5. The system of claim 1, wherein the instructions cause the batch process error recovery system to initiate operation of a smart contract associated with the at least one code snippet, wherein the smart contract includes a rule set associated with an entitlement rule set.

6. The system of claim 1, wherein the instructions cause the batch process error recovery system to initiate operation of a smart contract associated with the at least one code snippet, wherein the smart contract includes a rule set associated with a service failure rule set.

7. A method comprising:
   initiating, on a node of a plurality of processing nodes, a batch job process;
   receiving, from the node of the plurality of processing nodes, an indication of a batch process error;
   generating, by a code generator, a text prompt associated with the batch process error;
   generating, from the text prompt, at least one code snippet to resolve the batch process error;

testing, each code snippet of the at least one code snippet, whether the at least one code snippet resolves the batch process error;

performing a security check on each code snippet of the at least one code snippet;

replacing a portion of the batch job process with the code snippet; and restarting, from a failure point in the batch job process, the batch job process.

8. The method of claim 7, wherein the text prompt is generated by a quantum prompt generator based on error information received from the node.

9. The method of claim 7, wherein the code generator comprises a generative artificial intelligence engine that automatically generates the at least one code snippet based on the text prompt.

10. The method of claim 7, wherein the security check comprises an analysis of each code snippet to at least one rule set.

11. The method of claim 7, further comprising initiating operation of a smart contract associated with the at least one code snippet, wherein the smart contract includes a rule set associated with an entitlement rule set.

12. The method of claim 7, further comprising initiating operation of a smart contract associated with the at least one code snippet, wherein the smart contract includes a rule set associated with an service failure rule set.

13. Non-transitory computer readable media storing instructions that, when executed by at least one processor, cause a batch process error recovery system to:

receive, from a node of a plurality of processing nodes, an indication of a batch process error;

generate a text prompt associated with the batch process error;

generate, by a code generator and from the text prompt, at least one code snippet to resolve the batch process error;

test, each code snippet of the at least one code snippet, whether the at least one code snippet resolves the batch process error;

perform a security check on each code snippet of the at least one code snippet;

replace a portion of a batch job process with the code snippet; and restart, from a failure point in the batch job process, the batch job process.

14. The non-transitory computer readable media of claim 13, wherein the text prompt is generated by a quantum prompt generator based on error information received from the node.

15. The non-transitory computer readable media of claim 13, wherein the code generator comprises a generative artificial intelligence engine that automatically generates the at least one code snippet based on the text prompt.

16. The non-transitory computer readable media of claim 13, wherein the instructions cause the batch process error recovery system to initiate operation of a smart contract associated with the at least one code snippet, wherein the smart contract includes a rule set associated with an entitlement rule set.

17. The non-transitory computer readable media of claim 13, wherein the instructions cause the batch process error recovery system to initiate operation of a smart contract associated with the at least one code snippet, wherein the smart contract includes a rule set associated with an service failure rule set.

* * * * *